Patented Mar. 18, 1952

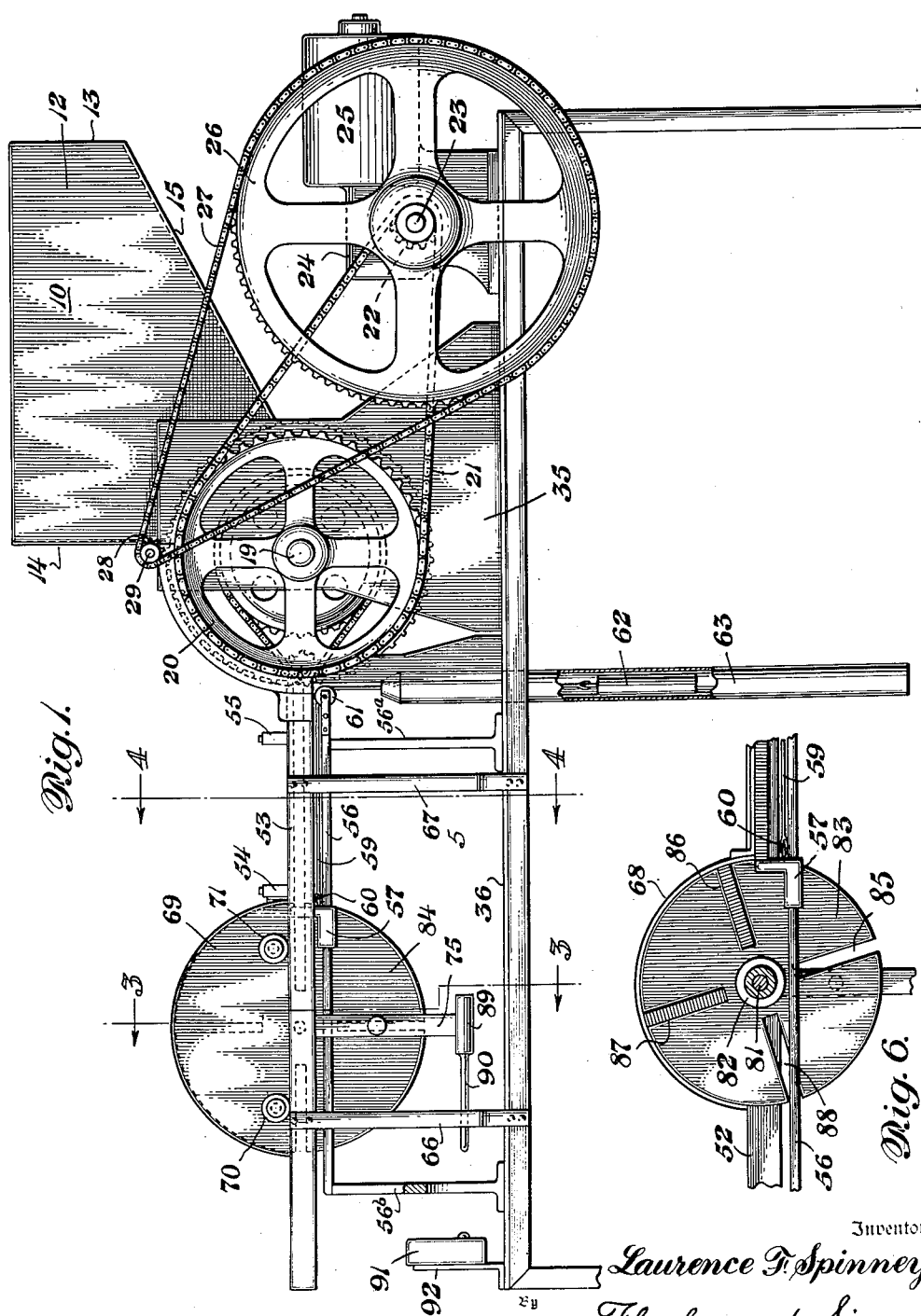

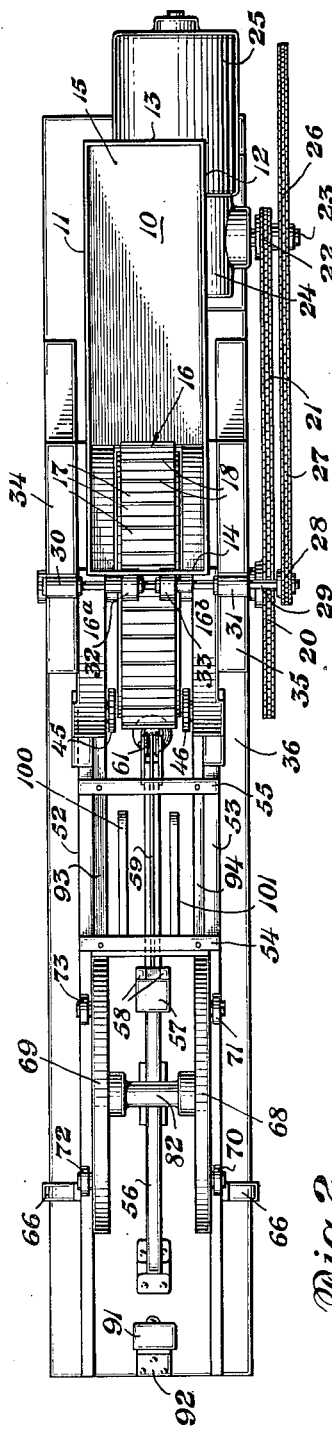
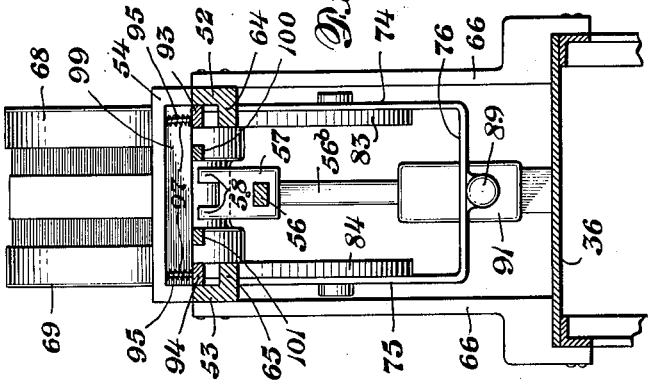
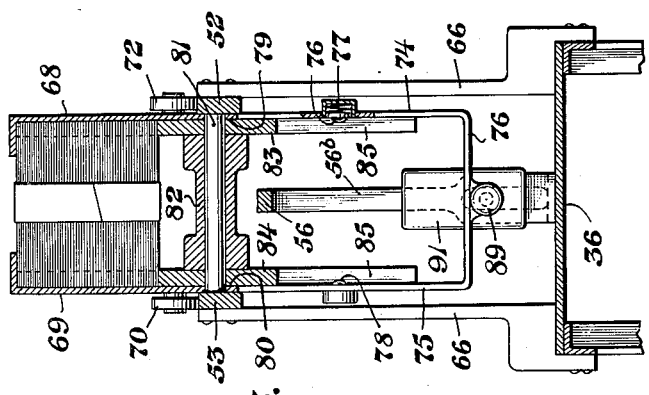

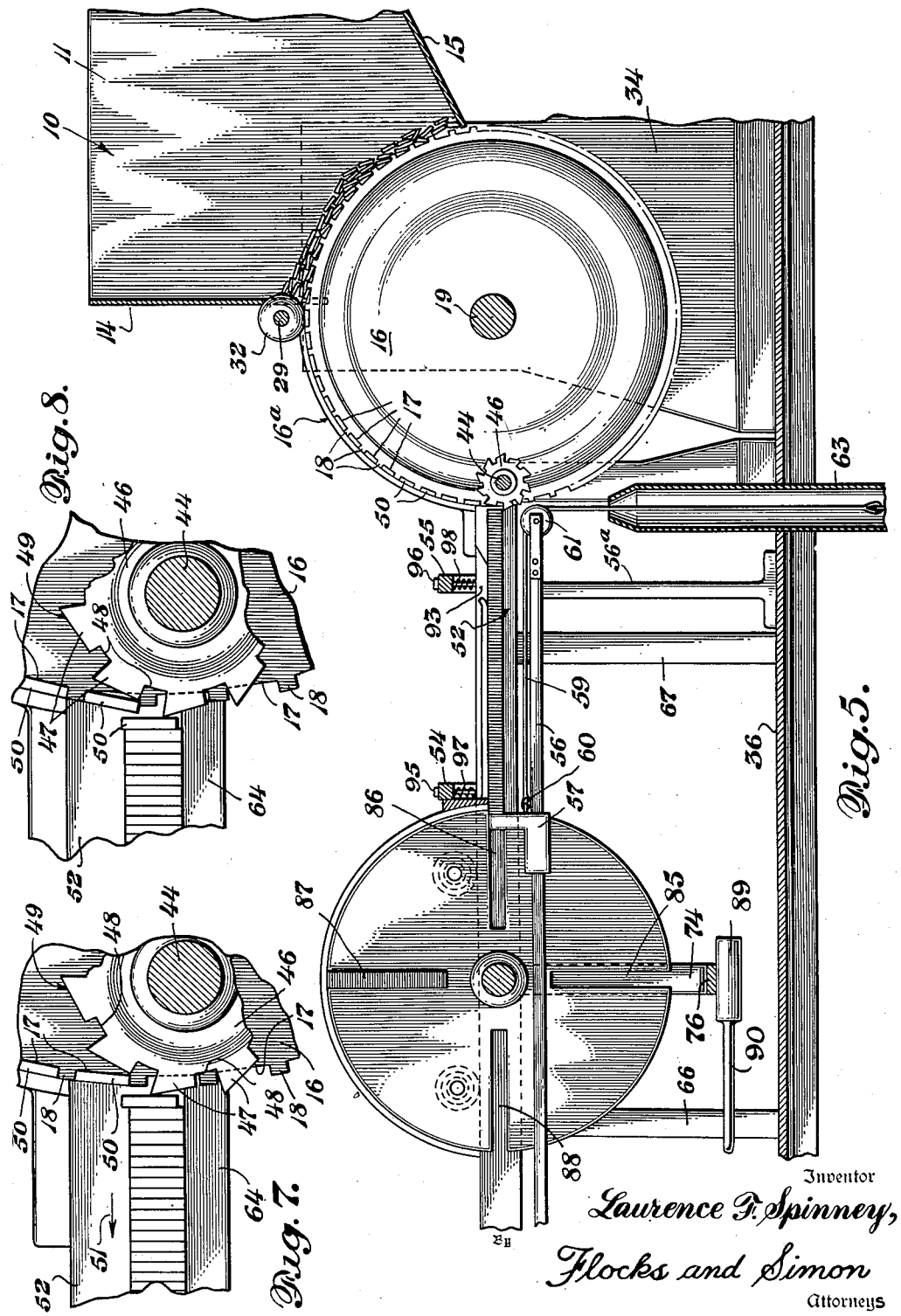

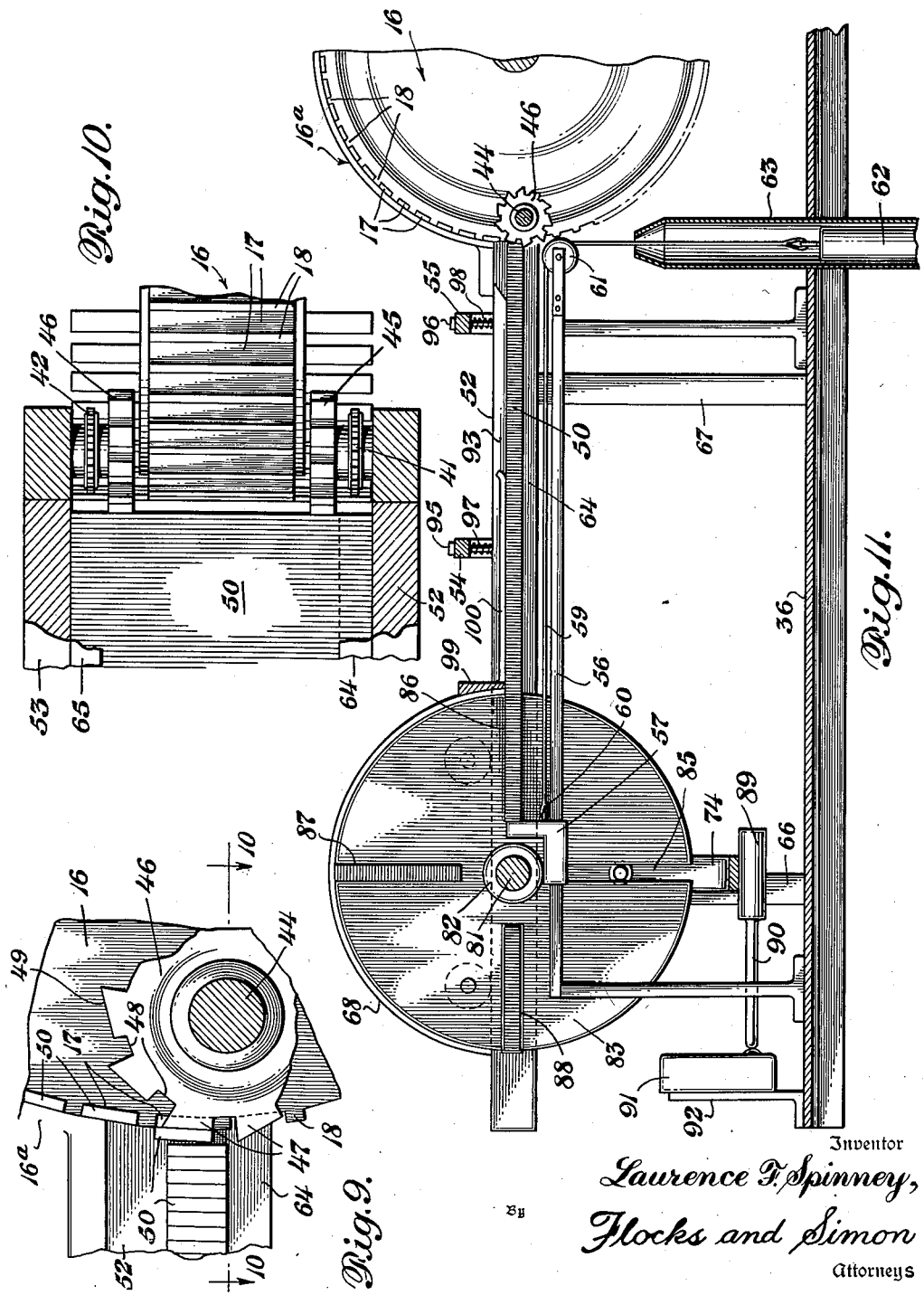

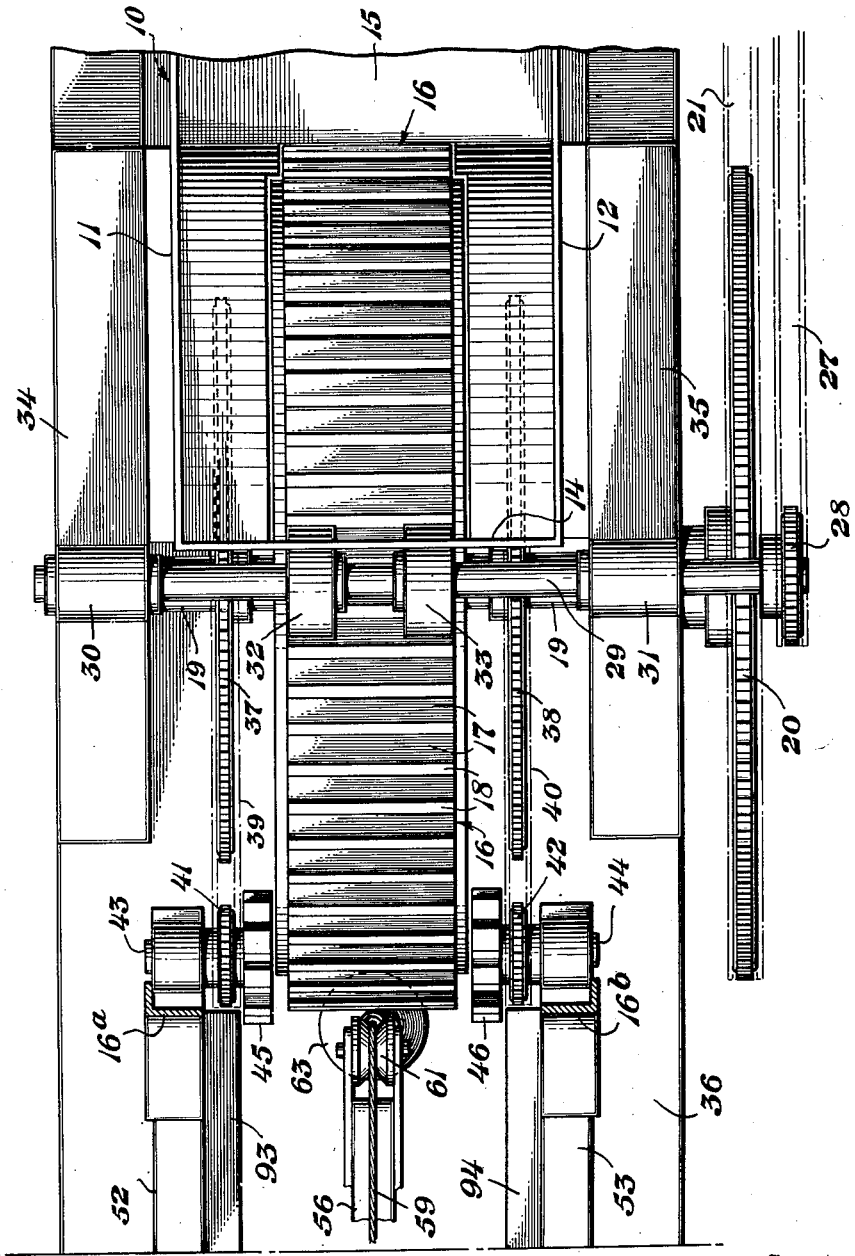

2,589,886

UNITED STATES PATENT OFFICE 2,589,886

APPARATUS FOR ASSEMBLING A PREDETERMINED QUANTITY OF STICKS

Lawrence F. Spinney, Oakland, Maine, assignor, by mesne assignments, to The Diamond Match Company, New York, N. Y., a corporation of Delaware Application January 3, 1947, Serial No. 719,987

12 Claims. (Cl. 93—93)

The present application relates to the bundling of sticks or applicators. More particularly the present invention relates to the assembly and bundling of a plurality of relatively flat sticks such as those inserted into ice cream and other confections and having a generally elongated flat shape.

In co-pending application, Serial No. 720,027, filed January 3, 1947, there is described and claimed a novel process for the production of ice cream sticks, tongue depressors and similar articles which includes a generally novel method of producing from the initial log, a stick of the character described of more uniform characteristics and somewhat different appearance than heretofore known. It is one of the steps of the process there described to assemble a plurality of sticks, as for example, fifty, in face-to-face relationship in the form of a compact bundle prior to rounding the ends thereof as by suitable grinding means or the like.

The present application is directed, among other things, to a novel apparatus for assembling together a plurality of sticks of the generally described character and including means for counting and suspending the sticks so that they may be fastened together by a suitable tape or the like.

It is one of the general objects of the present invention therefore to provide for the assembling of a plurality of relatively flat elongated sticks in face-to-face relationship while counting a predetermined number thereof and suspending the same for secure wrapping.

Another object of the present invention is to provide a novel apparatus whereby the sticks are automatically fed from a hopper or the like and assembled in face-to-face relationship for counting and packaging.

Another general object of the present invention is to provide a novel apparatus including stick assembling means, counting means and feeding means associated with the stick assembling means, said feeding means being associated with the counting means.

Other objects and the nature and advantages of the instant invention will be apparent from the following description taken in conjunction with the accompanying drawings, wherein:

Figure 1 is a side elevation of a machine for the bundling of sticks in accordance with the present invention.

Figure 2 is a plan view of the machine of Figure 1.

Figure 3 is a vertical section taken generally on the line 3—3 of Figure 1.

Figure 4 is a vertical section taken generally on the line 4—4 of Figure 1.

Figure 5 is an enlarged longitudinal section of a portion of the machine.

Figure 6 is a detail of the counting mechanism in partially rotated position.

Figure 7 is an enlarged detail of the cam means for ejecting the sticks from the assembly drum into the feed mechanism.

Figure 8 is a view similar to Figure 7 of the cam means in a different position.

Figure 9 is a view similar to Figures 7 and 8 showing the cam means at the beginning of the ejecting operation.

Figure 10 is a section taken on the line 10—10 of Figure 9.

Figure 11 is a longitudinal section of a portion of the machine with the counting mechanism in retracted position.

Figure 12 is an enlarged plan view of a portion of the apparatus according to the present invention.

The stick assembling mechanism

Referring to the figures of the drawing and particularly Figure 1 thereof, a hopper 10 is shown adapted to receive a plurality of relatively flat elongated sticks. The hopper 10 is provided with side walls 11 and 12, end walls 13 and 14, and a slanting bottom 15 which guides sticks within the hopper into contact with a rotating slotted drum indicated in general at 16. The drum 16 is provided with a plurality of seats or slots 17 extending transversely across the periphery of the drum 16 and separated by a plurality of transverse ribs 18, as best shown in Figures 5 and 12. Coextensive with the forward, upper portion of the drum 16 are a pair of guides 16a and 16b which serve to retain a plurality of sticks within the slots 17. The drum 16 is supported on and rotatable with a shaft 19 which also carries a driving sprocket 20 which cooperates with chain 21 trained about a driving sprocket 22 keyed to a drive shaft 23.

The drive shaft 23 is driven from a suitable transmission indicated at 24 which is in turn driven by a motor 25. The shaft 23 also carries and drives a relatively large sprocket 26 which is connected by the chain 27 to a sprocket 28 rotatable with a shaft 29 (see Figure 2). The shaft 29 is journalled in and supported by a pair of journals 30 and 31 and serves to drive a pair of feed rolls 32 and 33. The journals 30 and 31 are in turn carried by a pair of vertical frame members 34 and 35, respectively, which are in turn supported on a bed 36. The shaft 19 is also supported by suitable journals in the vertical frame members 34 and 35 and a pair of drive sprockets 37 and 38 are provided cooperating with a pair of chains 39 and 40, respectively, which are trained over and cooperate with a pair of sprockets 41 and 42. Each of the sprockets 41 and 42 is rotatable with a stub shaft 43 and 44 and when rotated serves to drive each respective stub shaft. Rotatable with the stub shafts are a pair of cam members 45 and 46. The stub shafts 43 and 44 and the cam members 45 and 46 are therefore driven from the shaft 19 and the sizes of the sprockets 41 and 42 and the drive sprockets 37 and 38 are so proportioned that the drive of the cam members 45 and 46 is coordinated with that of the drum 16. As best seen in Figures 7, 8, 9 and 10, each of the cam members 45 and 46 are provided with a plurality of cam teeth 47 which are separated from one another about the periphery of the cam members 45 and 46 by transverse portions 48. The cam teeth 47 are provided with faces 49 which are set at an angle radially relative to the cam members 45 and 46.

Preferably the cam members are driven at such speed that the peripheral speed of the cam teeth 47 is approximately similar to the peripheral speed of the drum 16. As shown in Figure 7 the teeth 47 will start a stick 50 out of its seat in the drum when the preceding stick is well beyond the drum. As the drum 16 and the cam member 45 continue to rotate together as shown in Figure 8, the lower portion of the stick 50 is moved out of the seat 17 and slid behind the next forward stick which at this time is carried forwardly by the preceding cam tooth. The continuing movement of the cam tooth 47 will then bring the stick to the position of Figure 9 where it is completely out of the seat 18 and then even farther out to the position of Figure 7 so that space is provided for the next stick. It will thus be seen that not only are the sticks ejected from the slots 17 but they are completely interleaved in a continuous manner in a column in face-to-face relation by the conjoint movement of the drum 16 and the cam members 45 and 46 which each simultaneously operate on an end of each stick in the manner just described.

The feed mechanism

As the drum 16 is rotated and the cam members 45 and 46 are similarly rotated as just described, each successive stick 50 is cammed from its groove and is fed forwardly or in the direction of the arrow indicated at 51 in Figure 7 on to a trackway including a pair of opposed L-shaped guide members 52 and 53 disposed in a generally horizontal plane. The guide members 52 and 53 are connected and spaced by a pair of straps 54 and 55 so that they will receive the ends of the sticks 50 therebetween, as best shown in Figure 2. Depending from the straps 54 and 55 are a pair of cover members 93 and 94 each suspended as by bolts 95 and 96 from the straps 54 and 55. The bolts are slidably mounted in the straps and springs 97 and 98 tend to bias the cover members 93 and 94 downwardly. Mounted below the guide members 52 and 53 is a guide rail 56 in general parallelism with the guide members. The guide rail 56 supported by vertical standards 56a and 56b is adapted to support for slidable movement thereon a follower 57 having a pair of upwardly projecting fingers 58 (see Figure 4) which are adapted to contact the face of the forwardmost stick and exert a constant tension on the horizontal column of assembled sticks so that as each stick is added to the column in face-to-face relationship by the cam teeth 47, the follower is moved to the left as seen in Figure 1 and exerts a constant pressure to maintain the sticks in assembled relation. The tension is imparted to the follower by a cable 59 attached to the follower at 60 and trained over a pulley 61 rotatably carried at one end of the guide rail 56. The other end of the cable 59 is attached to a weight 62 within a casing 63. The action of the weight, therefore, is to constantly urge the follower 57 against the sticks and each stick tends to move the follower to the left, as shown in Figure 1.

The counting and wrapping support mechanism

Extending horizontally from the members 52 and 53 are a pair of opposed rails 64 and 65 which are supported from the bed 36 by a pair of standards 66 and 67. A pair of turret casing members 68 and 69 are supported on the rails 52 and 53 and are adapted to slide horizontally along the rails 52 and 53. As best shown in Figures 2 and 3, this sliding support is effected by the castors 70, 71, 72 and 73, the castors 70 and 71 projecting from the casing member 68 and the castors 72 and 73 from the casing member 69. The lower ends of the casing members 68 and 69 are connected by a yoke having one leg 74 connected to the casing member 68 and a second leg 75 connected to the casing member 69, the two legs being connected by a portion 76. The casing members are also connected at their rear edge by a portion 99 provided with rearwardly extending bars 100 and 101 which tend to prevent the sticks from moving upwardly.

Projecting inwardly, for a purpose to be hereinafter described, from the leg 74 is a spring-pressed button 76 which is pressed outwardly by a spring indicated at 77. A similar button 78 projects outwardly from the leg 75. Partially depending from the casing member 68 is a thickened journal 79 and a similar journal 80 similarly depending from the casing member 69. The journals 79 and 80 rotatably support a shaft 81. Rotatably mounted on the shaft 81 is a hub 82 of a turret composed, in addition to the hub 82, of a pair of circular discs 83 and 84. The discs 83 and 84 are each provided with a plurality of axial slots 85, 86, 87 and 88. Each of the slots has a radial length equal to the combined thickness of the number of sticks which it is desired to assemble and bundle as, for example, the thickness of fifty sticks. As shown in Figure 3, the buttons 76 and 78 engage with the slots 85, 86, 87 and 88 and will prevent each respective disc 83 and 84 from rotating so as to fix the position of the turret until the same is manually rotated. The connecting portion 76 of the yoke is provided with a hub 89 having a horizontal projection 90 extending therefrom. The projection 90 is adapted during the retracted position of the turret assembly shown in Figure 11, to actuate the signal 91 which is supported as by the bracket 92 on the bed 36. The actuation of this signal indicates that the opposed slots in the discs 83 and 84 forming the turret have received a full complement of sticks and that the turret should be moved to a new position.

Operation

When the machine is in operation the sticks are loaded into the hopper 10 where the slanted bottom tends to force the sticks into contact with the drum 16. As the drum rotates in a counterclockwise direction, the feed rolls 32 and 33 are similarly moved and serve to force any sticks carried along with the drum into firm seating position in the slots 17. It will be understood that the feed rolls 32 and 33 being driven by the large sprocket 26 and the chain 27 which cooperates with the relatively small sprocket 28, are driven at a high speed as compared to the drum 16 and this relative speed aids in firmly seating the sticks within the slots. As the drum 16 rotates, the cam 45 is also rotated in synchronism with the drum 16, as previously described. This movement cams the sticks out of the slot and forces them onto the opposed guide rails 52 and 53 against the tension exerted by the follower fingers 58. During the initial operation of the machine, the turret is in the position shown in Figure 5 and the slot 86 is aligned with the guide rails 52 and 53 so that when the column of sticks reaches the end of the guide rails, they will be guided into the slot 86, progressively filling the slot 86 and forcing the follower to the left, as shown in Figure 5. As soon as the slot 86 is filled, the successive addition of sticks to the column by the cam fingers 47 will force the turret to the left until finally the turret has reached the position shown in Figure 11 and the projection 90 has actuated the signal 91. The operator then moves the turret in a counterclockwise direction, as shown in Figure 6, to bring the slot 85 into alignment with the guide members 52 and 53. As this is done, the follower moves to the right, as shown in Figure 11, to engage the front face of the remaining sticks. At the same time the turret is moved to the right into the position of Figure 1, at this time partially filling the slot 85 with sticks, depending upon the relative speed of the assembly drum 16 and the speed of the operator in manually moving the turret assembly. Thereafter the feed mechanism proceeds to fill the slot 85. While the slot 85 is being completely filled, the operator can wrap the bundle of sticks within the slot 86. After he has wrapped the sticks, he can then remove the wrapped bundle from the next proceeding slot and so forth.

It is apparent from the foregoing that by thus providing a relative movement of the turret casing members and the turret, each slot can be partially filled immediately upon rotation and the amount to which each slot is filled will depend on the relative speed of the machine and the operator in removing the bundled sticks and wrapping the assembled sticks.

It will be obvious to those skilled in the art that various changes may be made without departing from the spirit of the invention and therefore the invention is not limited to what is shown in the drawings and described in the specification but only as indicated in the appended claims.

I claim:

1. In a bundling machine for sticks or the like, means to assemble a plurality of sticks in face-to-face relation, a turret including a pair of spaced turret members having slots therein of a length to receive a predetermined plurality of opposed ends of said sticks and means to feed assembled sticks from said first mentioned means into said turret slots.

2. In a bundling machine for sticks or the like, means to assemble a plurality of sticks in face-to-face relation, a turret including a pair of spaced turret members having slots therein to receive opposed ends of said sticks, means to feed assembled sticks from said first mentioned means into said turret slots, and means movable between the spaced pair of turret members and cooperating with the assembled sticks to maintain said sticks in abutting relation.

3. In a bundling machine for sticks or the like, means to assemble a plurality of sticks in face-to-face relation, a turret including a pair of spaced turret members having slots therein to received opposed ends of said sticks, means to feed assembled sticks from said first mentioned means into said turret slots, and means movable between the spaced pair of turret members and cooperating with the assembled sticks to maintain said sticks in abutting relation, said last mentioned means including a follower member and means to urge said follower member against the sticks.

4. In an assembling mechanism for sticks or the like a hopper, movable means for conveying a plurality of sticks from said hopper in edge-to-edge relation, rotatable means having a peripheral path of rotation overlapping the path of said conveying means, and stick ejecting means on said rotatable means positioned to contact and eject successive sticks from said conveying means upon rotation past the path of said conveying means.

5. In an assembling mechanism for sticks or the like, a hopper, movable means for conveying a plurality of sticks from said hopper, rotatable means having a smaller orbit of rotation than the path of said conveying means, said orbit intersecting the path of said conveying means and stick ejecting means on said rotatable means positioned to contact the sticks on said conveying means upon the intersection of the orbit of rotation of said rotatable means and the path of said conveying means to thereby eject successive sticks from said conveying means.

6. In an assembling mechanism for sticks or the like, a hopper, rotatable means at least in part forming the bottom of said hopper, a second rotatable means having an orbit of rotation intersecting the first rotatable means, a guide way for sticks having a portion thereof adjacent the orbit of both of said rotatable means, and stick ejecting means on said second rotatable means positioned to contact and eject successive sticks from said rotatable means and into said guide way upon rotation past the point of intersection of said rotatable means.

7. In an assembling mechanism for sticks or the like, movable means for conveying a plurality of sticks in edge-to-edge relation, rotatable means having a path of rotation intersecting the path of said conveying means, and stick ejecting means having a leading edge and a slanting face increasingly projecting beyond said leading edge to thereby eject successive sticks from said conveying means upon rotation past the point of intersection of said rotatable means and said conveying means.

8. In a bundling machine for sticks or the like, means to assemble a plurality of sticks in face-to-face relation, an intermittently rotatable turret provided with slots to receive a predetermined quantity of said sticks and maintain said separated sticks in assembled relationship for the wrapping of a binder thereabout, and means to feed assembled sticks from said first mentioned means into the slots in said turret, said turret being slidably mounted so as to move in telescopic relation to said feed means as sticks are fed into said turret from said feed means.

9. In a bundling machine for sticks or the like, means to assemble a plurality of sticks in face-to-face relation, an intermittently rotatable turret provided with slots to receive a predetermined quantity of sticks and maintain said separated sticks in assembled relationship for the wrapping of a binder thereabout, means to feed assembled sticks from said first mentioned means into the slots in said turret, said turret being slidably mounted so as to move in telescopic relation to said feed means as sticks are fed into said turret from said feed means, and signal means operated upon a predetermined movement of said turret.

10. In a bundling machine for sticks or the like, means to assemble a plurality of sticks in face-to-face relation, an intermittently rotatable turret provided with slots to receive a predetermined quantity of said sticks and maintain said separated sticks in assembled relationship for the wrapping of a binder thereabout, means to feed assembled sticks from said first mentioned means into the slots in said turret, said turret being slidably mounted so as to move in telescopic relation to said feed means as sticks are fed into said turret from said feed means, and means extending from said turret over said feed means to retain said sticks in aligned relation.

11. In a bundling machine for sticks or the like, movable means to convey sticks in substantially continuous edge-to-edge relation, guide means adjacent said conveying means to receive sticks therefrom and guide said sticks in face-to-face relation in a continuous column, separating means movable to separate a predetermined quantity of sticks from one end of said column and maintain said separated sticks in assembled relation for the wrapping of a binder thereabout, said separating means having a stick receiving portion in alignment with a portion of said guide means remote from said movable means, said stick receiving portion having a length to measure a predetermined number of sticks, yieldable means adjacent said separating means and having a portion positioned to contact the face of an end stick in said column to maintain said sticks in said guide means in closely abutting relation, and ejecting means in continuous contact with a stick at the other end of said column and movable to forcibly eject sticks from said movable means into said guide means in opposition to the pressure of said yieldable means.

12. The bundling machine of claim 11, wherein the ejecting means includes a plurality of members movable to successively contact said sticks and wherein each of said members after ejecting a stick from said movable means maintains contact with said stick to maintain said stick and column in position in opposition to the pressure of said yieldable means.

LAWRENCE F. SPINNEY.

REFERENCES CITED

The following references are of record in the file of this patent:

UNITED STATES PATENTS

| Number | Name | Date |
|---|---|---|
| 361,548 | Richards | Apr. 19, 1887 |
| 694,634 | Griswold | Mar. 4, 1902 |
| 890,953 | Armstrong | June 16, 1908 |
| 997,201 | Mascord | July 4, 1911 |
| 1,263,515 | Biehler et al. | Apr. 23, 1918 |
| 1,702,901 | Hungerford | Feb. 19, 1929 |
| 1,798,685 | Kurtenbach | Mar. 31, 1931 |
| 1,976,351 | Matthiesen | Oct. 9, 1934 |
| 2,049,022 | Reininger | July 28, 1936 |
| 2,214,814 | Hambleton | Sept. 17, 1940 |
| 2,254,291 | Joa | Sept. 2, 1941 |
| 2,270,300 | Hothersall | Jan. 20, 1942 |
| 2,285,715 | Hopkins | June 9, 1942 |